(12) United States Patent
Khalid et al.

(10) Patent No.: US 12,468,457 B2
(45) Date of Patent: Nov. 11, 2025

(54) DATA MAINTENANCE AND DELETION WITH TRUSTWORTHY ENERGY AWARENESS

(71) Applicant: Dell Products L.P., Round Rock, TX (US)

(72) Inventors: Ahmed Khalid, Cork (IE); Aidan O'Mahony, Cork (IE); Alan Barnett, County Cork (IE); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,818

(22) Filed: Jan. 24, 2024

(65) Prior Publication Data
US 2025/0238149 A1    Jul. 24, 2025

(51) Int. Cl.
| G06F 3/06 | (2006.01) |
| G06F 11/14 | (2006.01) |
| G06F 12/02 | (2006.01) |

(52) U.S. Cl.
CPC .......... *G06F 3/0625* (2013.01); *G06F 3/0619* (2013.01); *G06F 3/0652* (2013.01); *G06F 3/0679* (2013.01); *G06F 11/1458* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 7,610,437 B2 * | 10/2009 | Sinclair | ................. | G06F 3/0652 |
| | | | | 711/104 |
| 7,984,084 B2 * | 7/2011 | Sinclair | ............... | G06F 16/1847 |
| | | | | 707/818 |
| 8,285,918 B2 * | 10/2012 | Maheshwari | ........ | G11C 7/1072 |
| | | | | 711/159 |
| 8,429,359 B1 * | 4/2013 | Desai | ................... | G06F 11/1461 |
| | | | | 711/E12.103 |
| 8,443,263 B2 * | 5/2013 | Selinger | ............... | G06F 11/1068 |
| | | | | 714/768 |
| 8,538,919 B1 * | 9/2013 | Nielsen | ............... | H04L 63/0272 |
| | | | | 718/1 |
| 8,593,678 B2 * | 11/2013 | Ohishi | ................. | H04N 1/2166 |
| | | | | 358/1.15 |
| 8,873,284 B2 * | 10/2014 | Sinclair | ............... | G06F 12/0246 |
| | | | | 365/185.11 |
| 9,075,705 B2 * | 7/2015 | Hikichi | ................. | G06F 11/004 |

(Continued)

OTHER PUBLICATIONS

Anonymous, "Machine Learning Models", Jan. 7, 2023, pp. 1-7, https://www.databricks.com/glossary/machine-learning-models#:~:text=The%20process%20of%20running%20a,the%20trained%20machine%20learning%20model. (Year: 2023).*

(Continued)

*Primary Examiner* — Christopher D Birkhimer
(74) *Attorney, Agent, or Firm* — Workman Nydegger

(57) ABSTRACT

One example method includes receiving a request to perform a data process, determining, by a trustworthy energy awareness (TEA) module, based on energy information and user constraints, a best time to perform the data process, and conveying, by the TEA module to a recipient, information indicating the best time to perform the data process. The data process may be a data backup process, or a garbage collection process, for example.

18 Claims, 5 Drawing Sheets

(56) References Cited

U.S. PATENT DOCUMENTS

| | | | | |
|---|---|---|---|---|
| 9,092,182 | B2* | 7/2015 | Ohishi | H04N 1/00944 |
| 9,223,693 | B2* | 12/2015 | Sinclair | G06F 12/0246 |
| 9,336,133 | B2* | 5/2016 | Sinclair | G06F 12/0246 |
| 9,344,596 | B2* | 5/2016 | Ohishi | H04N 1/00973 |
| 9,348,746 | B2* | 5/2016 | Sinclair | G06F 12/0246 |
| 9,465,731 | B2* | 10/2016 | Sinclair | G06F 12/0246 |
| 9,652,382 | B1* | 5/2017 | Subramanian | G06F 12/0253 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 9,800,291 | B1* | 10/2017 | Ben David | G06F 11/1415 |
| 10,108,543 | B1* | 10/2018 | Duggal | G06F 11/14 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,255,179 | B2* | 4/2019 | Ji | G06F 3/0659 |
| 10,430,279 | B1* | 10/2019 | Dittia | G06F 3/0656 |
| 10,739,996 | B1* | 8/2020 | Ebsen | G06F 16/1727 |
| 10,795,812 | B1* | 10/2020 | Duggal | G06F 3/067 |
| 10,983,715 | B2* | 4/2021 | Sharoni | G06F 21/79 |
| 11,086,537 | B2* | 8/2021 | Byun | G06F 3/0604 |
| 11,704,043 | B1* | 7/2023 | Throgmorton | G06F 11/1469 711/162 |
| 2004/0117414 | A1* | 6/2004 | Braun | G06F 8/65 |
| 2006/0005074 | A1* | 1/2006 | Yanai | G06F 11/2066 714/6.32 |
| 2007/0033325 | A1* | 2/2007 | Sinclair | G06F 3/0608 711/170 |
| 2008/0082596 | A1* | 4/2008 | Gorobets | G06F 12/0253 |
| 2008/0140902 | A1* | 6/2008 | Townsend | H04B 1/0475 710/306 |
| 2008/0189477 | A1* | 8/2008 | Asano | G06F 12/0246 711/E12.008 |
| 2008/0307020 | A1* | 12/2008 | Ko | G06F 21/6245 |
| 2009/0041230 | A1* | 2/2009 | Williams | G06F 11/1448 707/999.204 |
| 2011/0145473 | A1* | 6/2011 | Maheshwari | G11C 7/1072 711/E12.008 |
| 2011/0161784 | A1* | 6/2011 | Selinger | G06F 11/1016 714/E11.002 |
| 2011/0236049 | A1* | 9/2011 | Haga | G03G 15/5004 399/75 |
| 2013/0024423 | A1* | 1/2013 | Doshi | G06F 11/1448 707/640 |
| 2013/0173554 | A1* | 7/2013 | Ubukata | G06F 11/2094 707/640 |
| 2014/0325148 | A1* | 10/2014 | Choi | G06F 3/0659 711/114 |
| 2014/0365719 | A1* | 12/2014 | Kuzmin | G06F 12/0246 711/103 |
| 2015/0227602 | A1* | 8/2015 | Ramu | G06F 11/1456 707/634 |
| 2016/0196216 | A1* | 7/2016 | Lee | G06F 3/0631 711/170 |
| 2016/0246713 | A1* | 8/2016 | Choi | G06F 3/0608 |
| 2017/0123655 | A1* | 5/2017 | Sinclair | G06F 3/061 |
| 2017/0132082 | A1* | 5/2017 | Resch | G06F 11/1076 |
| 2017/0132086 | A1* | 5/2017 | Blackburn | G06F 11/1466 |
| 2017/0242790 | A1* | 8/2017 | O'Krafka | G06F 3/0652 |
| 2018/0189175 | A1* | 7/2018 | Ji | G06F 3/0679 |
| 2020/0089420 | A1* | 3/2020 | Sharoni | G06F 21/79 |
| 2020/0192794 | A1* | 6/2020 | Lee | G06F 12/0246 |
| 2020/0218653 | A1* | 7/2020 | Ryu | G06F 12/0253 |
| 2020/0310686 | A1* | 10/2020 | Truong | G06F 3/061 |
| 2021/0342362 | A1* | 11/2021 | Haravu | G06F 11/1464 |
| 2021/0406216 | A1* | 12/2021 | Komatsu | G06F 16/11 |
| 2023/0112692 | A1* | 4/2023 | Richard | G06F 3/0604 711/154 |
| 2024/0385757 | A1* | 11/2024 | Buban | G06F 11/1004 |
| 2024/0385933 | A1* | 11/2024 | Gupta | G06F 11/1458 |

OTHER PUBLICATIONS

Harkiran78, "What is Machine Learning?", Feb. 5, 2023, pp. 1-15, https://web.archive.org/web/20230205081311/https://www.geeksforgeeks.org/what-is-machine-learning/ (Year: 2023).*

* cited by examiner

DATA MAINTENANCE AND DELETION WITH TRUSTWORTHY ENERGY AWARENESS

FIELD OF THE INVENTION

Embodiments of the present invention generally relate to the use of energy related considerations when conducting operations in a computing system. More particularly, at least some embodiments of the invention relate to systems, hardware, software, computer-readable media, and methods, for performing operations such as data maintenance, and data deletion, in a way that is sensitive to energy-related considerations.

BACKGROUND

Maintenance is the process of preserving and ensuring data quality, reliability, and availability over time. It involves various tasks such as data rehydration (decompressing older data), data movement (balancing the loads on storage nodes), data cleansing (identifying and fixing inaccurate data), data deduplication, and data purging (removing unusable data). Some maintenance operations are urgent while others can be casual, elective, or low priority.

While smart predictive maintenance is a known technique in data storage systems, this type of maintenance is based primarily on the use of AI/ML (artificial intelligence/machine learning) to determine the timing and likelihood of system or component failures. As another example, conventional data deletion approaches have various decision points, for example, garbage collection sweeping may occur periodically, but are limited in their implementations to the use of criteria such as, after a certain amount of memory has been allocated, or when memory usage exceeds a certain threshold.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
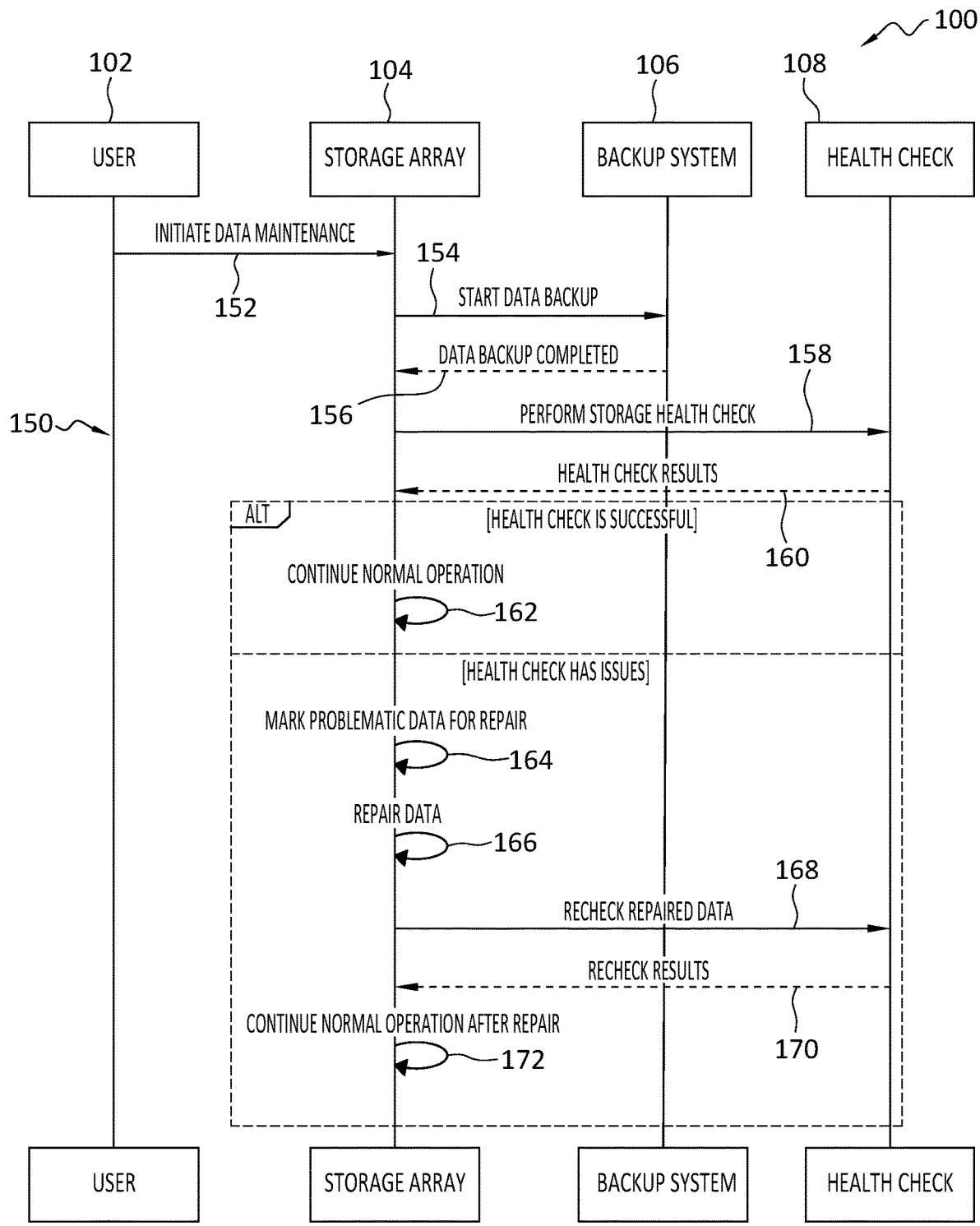
FIG. 1 discloses aspects of a first comparative example, involving data maintenance, for illustrating aspects of one embodiment.

Embodiments of the present invention generally relate to the use of energy related considerations when conducting operations in a computing system. More particularly, at least some embodiments of the invention relate to systems, hardware, software, computer-readable media, and methods, for performing operations such as data maintenance, and data deletion, in a way that is sensitive to energy-related considerations.

One example embodiment is directed to a method that operates to perform a process, such as data maintenance or garbage collection for example, based on various considerations, one example of which is energy-awareness. This example method may comprise the following operations: sending, by a user such as a host to a storage array, a request for performance of a data process; when the request is not urgent, requesting, by the storage array from a TEA (trustworthy energy awareness) module, a best time to perform the data process; using, by the TEA module, energy statistics and other information to determine a time window, for performing the data process, that meets, or most closely meets as among a group of possible time windows, one or more constraints applicable to the data process; sending, by the TEA module to the storage array, information identifying the time window(s); and initiating, by the storage array during the time window, the data process. It is noted that as used herein, 'data process' is general and is not intended to be limited to any particular process. Examples of data processes include, but are not limited to, a data maintenance processes such data rehydration (decompressing older data), data movement (balancing the loads on storage nodes), data cleansing (identifying and fixing inaccurate data), data deduplication, data purging (removing unusable data). Other data processes include garbage collection.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that energy-related considerations, such as an amount of energy expected to be consumed by a data process, may play a decisive role in a decision as to when that data process will be performed. An embodiment may enable a data owner to realize a cost savings, relative to conventional approaches, for performing data processes such as data maintenance, and garbage collection. An embodiment may incentivize the use of energy-efficient time frames for performing data processes. Various other advantages of some example embodiments will be apparent from this disclosure.

A. Aspects of Some Example Operating Environments for an Embodiment

The following is a discussion of some aspects of one or more example operating environments for an embodiment. This discussion is not intended to limit the scope of the invention, or the applicability of the embodiments, in any way. In general, embodiments of the invention may be implemented in connection with systems, software, and components, that individually and/or collectively implement, and/or cause the implementation of, data processes including, but not limited to, data maintenance, and garbage collection.

At least some embodiments of the invention provide for the implementation of the disclosed functionality in connection with existing data storage platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment. Some example cloud storage environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud environment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Finally, example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Overview of Aspects of an Example Embodiment

An example embodiment may differ from conventional approaches at least insofar as an embodiment may take account of energy-related considerations, such as the energy cost and energy efficiency, when planning and performing various data processes. For example, an embodiment may consider when data maintenance operations should be carried out and ensuring that the maintenance is energy and cost efficient. That is, an embodiment may be referred to as being energy aware.

Making a data process, such as data maintenance operations, "energy aware" includes performing data maintenance tasks in an energy efficient manner such as, for example, rearranging data in storage at timeslots when the cost of energy is low or when greener energy sources are readily available. In an embodiment, and similar to data maintenance processes, processes such as data deletion may not always be implemented when requested. Rather, the data may be marked to be deleted at a more suitable time. Such data deletion processes may include, garbage collection, wear leveling, and TRIM/UNMAP operations. While conventional approaches to these processes do have their own criteria for execution, none take advantage of renewable energy costs. Thus, in an embodiment, TEA modules and frameworks can optimize the energy objectives when performing data operations. Moreover, because conventional deletion and maintenance modes and operations in existing systems do not interact with such frameworks and carry out tasks accordingly, especially in distributed ecosystems, an embodiment may address this problem by implementing a workflow for trustworthy energy-aware data maintenance and data deletion operations, among others. As noted elsewhere herein, such data maintenance operations in connection with which one or more embodiments may be employed include, but are not limited to, data rehydration (decompressing older data), data movement (balancing the loads on storage nodes), data cleansing (identifying and fixing inaccurate data), data deduplication, and data purging (removing unusable data).

Thus, an embodiment may operate to classify data maintenance operations as urgent or non-urgent, and then perform tasks based on trustworthy energy-awareness. An embodiment may implemented in centralized environments, as well as in decentralized environments. As discussed in further detail below in connection with FIGS. 1 and 2, an example workflow for energy-aware data maintenance, according to one embodiment, may comprise the following operations: (1) The storage array or controller receives a request for data maintenance; (2) depending on the type of the task, the storage array queries the appropriate component to determine the level of urgency—for example, if a user requests data backup, the storage controller may ask the user how urgent the request is; (3) urgent tasks may be carried out in a conventional manner-however, for tasks that are not urgent, the controller requests TEA for the best time given various requirements, such as SLAs (service level agreements), time limits, and other user and/or system constraints—the TEA returns the best timeslot that meets, or most closely meets, all the requirements and constraints; (4) the data is marked for operation accordingly and carried out at the scheduled time—the process may be repeated for other maintenance operations—for example, if the health check is unsuccessful and data repair is required, the storage array may request the TEA module to suggest, based in whole or in part on energy-related considerations such as energy cost and/or energy source for example, the best time within a given timeslot.

Figure 3:
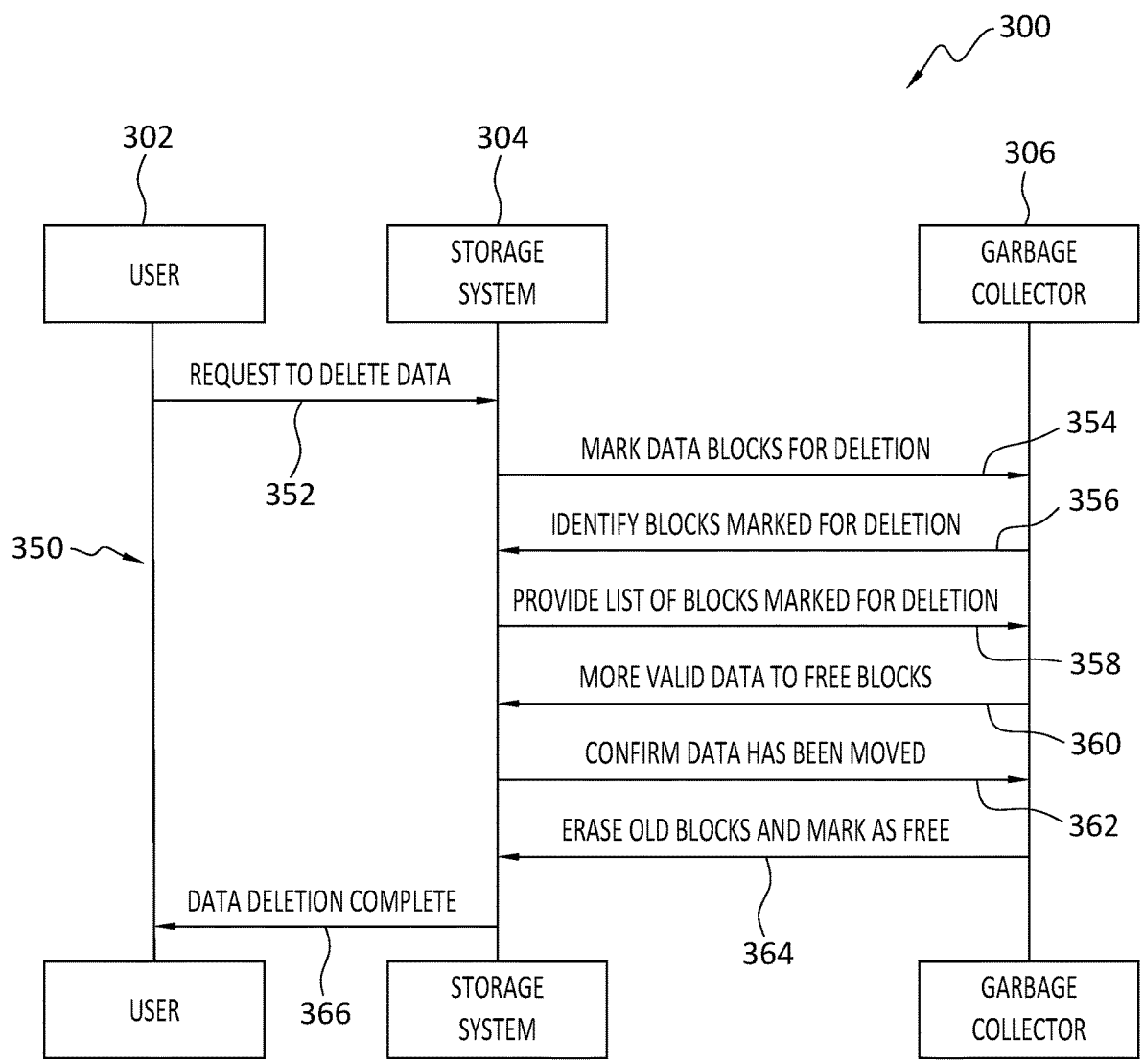
FIG. 3 discloses aspects of a second comparative example, involving garbage collection, for illustrating aspects of one embodiment.
Figure 4:
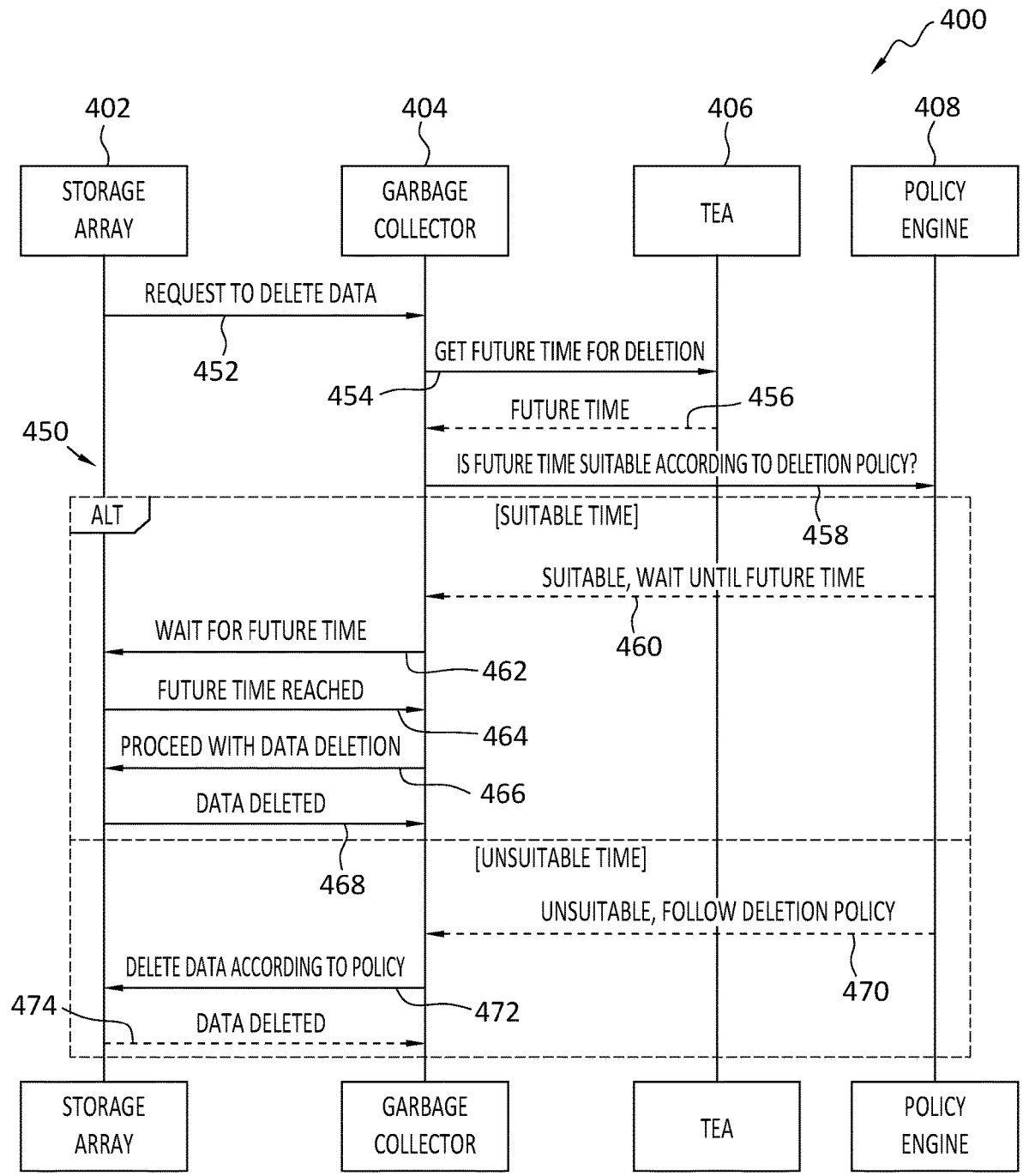
FIG. 4 discloses aspects of an architecture and method for garbage collection, according to one embodiment.

FIGS. 3 and 4, discussed below, disclose, respectively, examples of a data deletion operation without, and with, trustworthy energy awareness taken into consideration. In this example embodiment, making the data deletion "energy aware" may comprise marking data to be deleted considering the predicted cost of deletion—for example, large numbers of files/blocks/objects take more energy to delete than a smaller number of files/blocks/objects. Also, priority information can be added, that is, some data may be a higher priority for deletion than other data due, for example, to the respective storage costs for those groups of data.

Thus, an embodiment may combine (1) data deletion priority with (2) energy cost to schedule a permanent deletion process, such as at a particular timeslot when certain criteria are met, for example, when there is an abundance of renewable power available, or when relatively inexpensive power is available. In order to compute a predicted cost of the data deletion, an embodiment may consider elements such as the system resources required (CPU/IO bandwidth) and the overheads with the chosen approach. An embodiment may then combine this information with the policy, such as a secure data deletion policy for example, and then apply these combined elements to determine the constraints for the data deletion. In an embodiment, a TEA module, which may comprise an ML (machine learning) model may, generate and optimized data deletion strategy.

C. Aspects of an Example Embodiment of a TEA Module

In an embodiment, a TEA module may comprise an ML (machine learning) model that may be trained, using a training data set, to draw inferences based on input received. Example training data, and/or inputs to the ML model, may include, but are not limited to, information concerning one or more data operations, such as: historical energy consumption information, and associated financial costs; rated energy efficiency; observed energy efficiency; and, observed energy efficiency trend information over time, and/or with respect to differing data operation sizes (volume of data) and volumes (number of delete operations per unit time). In an embodiment, these inputs and/or training data may be obtained from various sources including, but not limited to, a storage array vendor, a backup system vendor, and trusted sources such as the storage array or backup system itself. Other inputs and/or training data for the ML model may comprise customer requirements, constraints, SLA terms, and user objectives.

For example, a customer may specify that it only wants to delete data from a particular type of storage, such as block storage or object storage for example, or the customer may specify that the data is to be deleted according to a priority or schedule. For example, older data may be deleted before relatively newer data, or data in more expensive storage may be deleted before data that is held in less expensive, in terms of cost to store, storage. As another example, an embodiment may consider the cost of data deletion against the cost to retain the data in its current location. For example, the cost, in terms of energy expenses, to retain the data in its current location may, or may not, exceed the cost incurred by waiting for the optimal time to delete the data.

These example inputs may be used by the ML model in the drawing of inferences. Moreover, a customer may identify priorities as among its various requirements and conditions. For example, the top customer priority may be to delete data from the most expensive storage type first, such as block storage versus object storage for example, with the next priority being the energy cost associated with performing the data deletion in that particular storage environment. In this example, the ML model may first identify the most expensive storage type, even though there may be, for example, a storage platform that is more energy efficient than this expensive storage type when performing data deletion operations.

In an embodiment, the ML model may draw various inferences based on the input(s) provided to the ML model. For example, the ML model may predict, given one or more user constraints, and energy related considerations, when a particular data process should be performed. In an embodiment, the ML model of the TEA module may identify one, or more, timeslot(s) that meet the specified constraints and considerations. Moreover, during and after performance of the data process, the ML model may receive feedback from the storage array and/or backup system that may comprise energy efficiency information, relating to the selected process for performing the data process, that may be used by the ML model to generate future inferences.

In an embodiment, comparisons may be drawn between a prediction made by the ML model, and the actual outcome. For example, an ML model may predict that performance of a data process during a particular timeslot, and in a particular environment, may, given one or more applicable constraints, provide the most energy efficient operation but, in practice, it may turn out that performing the data process during another timeslot would have provided more energy efficient performance. Depending upon the gap between actual and expected energy performance, a confidence score may be assigned to future predictions generated by the ML model. The confidence scores may serve as a guide for retraining the ML model, and/or for selection of a different ML model for future operations.

D. Aspects of Some Comparative Examples, and Related Embodiments

The following is a discussion of some aspects of various comparative examples, presented for the purpose of facilitating the illustration of various aspects of one or more example embodiments. This discussion is not intended to limit the scope of the invention, or the applicability of the embodiments, in any way.

D.1 Comparative Example—Data Maintenance

With reference now to FIG. 1, an architecture 100 is shown that includes various entities, namely, a host such as user 102, a storage array 104 that may comprise a storage controller, a data backup system 106, and a health check module 108, each of which may communicate with the others. A method 150 implemented in the architecture 100 may begin with the initiation 152 of a data process, such as data maintenance, by the user 102. The initiation 152 may comprise a communication from the user 102 to the storage array 104 and the storage array 104 may, in response, begin a data backup operation 154 that may comprise transmission of data from the storage array 104 to the backup system 106. Upon completion of the data backup operation 154, the backup system 106 may notify 156 the storage array 104 that the data backup operation 154 has been completed.

The storage array 104 may transmit 158, to the health check module 108, a request for a storage health check. In response, the health check module 108 may return 160 results of the health check to the storage array 104. If the health check results indicate that the health check was successful, that is, there are no problems with the data that was backed up, normal operations may continue 162.

On the other hand, if the returned 160 health check results indicate an issue with the health check, the storage array 104 may mark the problematic data 164 for repair. The marked data may then be repaired 166 as needed.

After the data has been repaired 166, a request for a further storage health check may be transmitted 168 by the storage array 104 to the health check module 108. The health check module 108 may respond by returning 170 the results of the further storage health check to the storage array 104. In the example of FIG. 1, the recheck results indicate that the further health check was successful. The storage array 104 may then continue 172 normal operations.

D.2 Example Embodiment—Data Maintenance

As illustrated by this comparative example of FIG. 1, no provision is made for the collection, or use, of energy-related information, such as, for example, energy consumption in the performance of the data process. Rather, the comparative method 150 is performed in a simple loop form, uninformed or influenced by energy-related considerations. In contrast, and as discussed below in connection with FIG. 2, an example embodiment may consider, for example, expected energy consumption by a data process, when making determinations as to when that data process should be performed.

Figure 2:
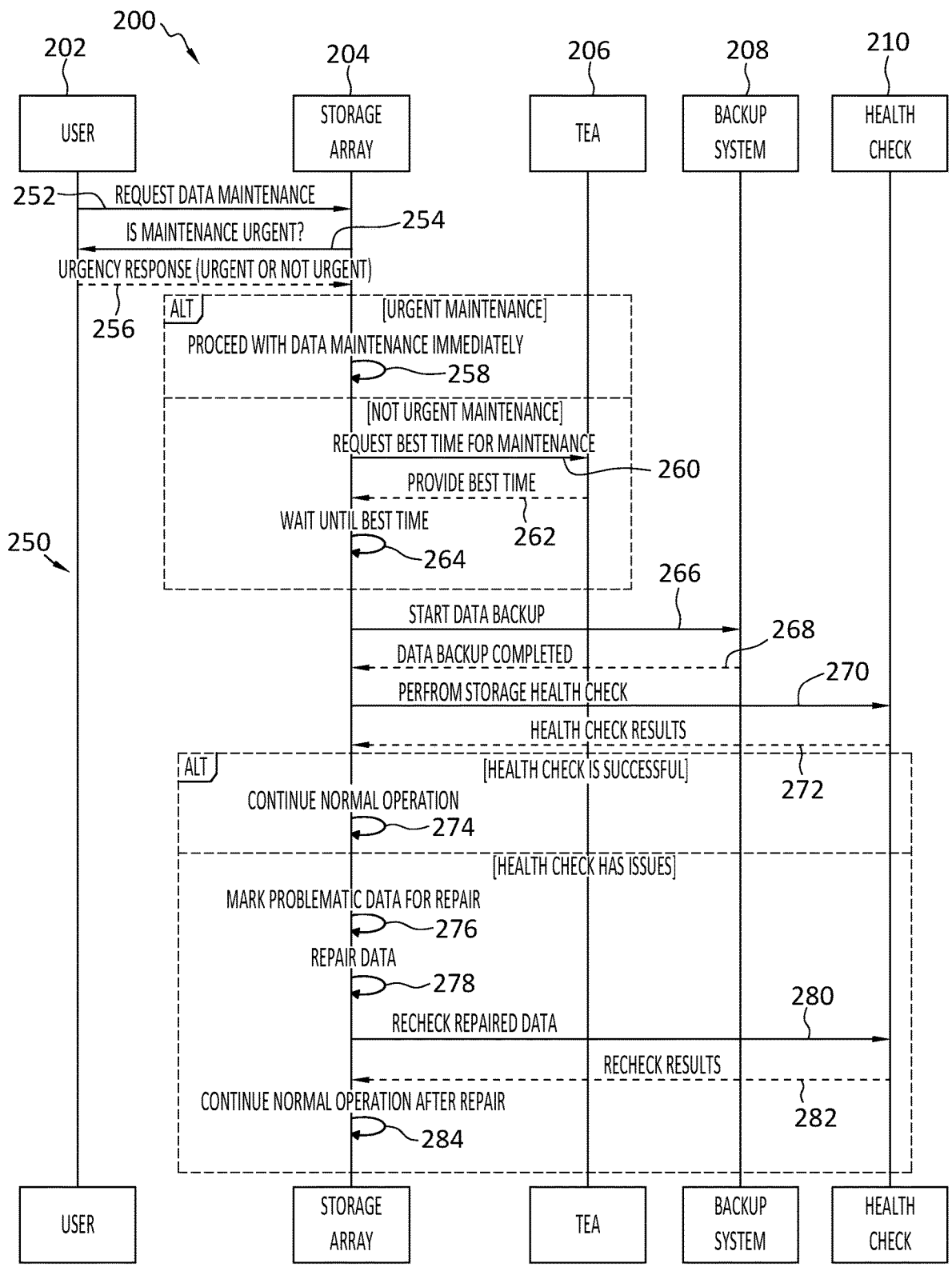
FIG. 2 discloses aspects of an architecture and method for data maintenance, according to one embodiment.

Turning now to the example of FIG. 2, an architecture 200 is shown in which an example method 250 according to an embodiment may be performed. The architecture 200 may include various entities, namely, a host such as user 202, a storage array 204 that may comprise a storage controller, a TEA module 206, a data backup system 208, and a health check module 210, each of which may communicate with the others. Any of the aforementioned components may receive/transmit data and/or information and metadata from/to any of the other aforementioned components. In an embodiment, the user 202, storage array 204, and TEA module 206 may be co-located at a common site, although that is not required. In an embodiment, the storage array 204 and TEA module 206 may be co-located at a common site with the backup system 208 and the health check module 210, although that is not required. In an embodiment, the user 202, storage array 204, TEA module 206, data backup system 208, and health check module 210, may all be co-located at a common site.

Prior to performance of the example method 250, or as part of the example method 250, various user constraints and other information, such as SLA terms, may be, or have been, provided to the TEA module 206 to inform predictions to be generated by the TEA module 206. Additionally, or alternatively, the user constraints and other information may be provided by the user 202 when the user 202 sends a request for data maintenance to the storage array 204. For example, the user 202 may generate a data maintenance request that includes the user constraints and information, and that also identifies the data concerning which the data maintenance process is to be performed.

With continued reference to FIG. 2, the example method 250 may begin when the user 202 transmits, to the storage array 204, a request 252 for the performance of a data maintenance process. In an embodiment, the data maintenance process may comprise a data backup process, and/or any of the other data processes disclosed herein. After receipt of the request, the storage array 204 may query 254 the user 202 as to whether the data maintenance process is urgent, and the user 202 may respond 256 that the data maintenance process is, or is not, urgent.

If it is urgent that the data maintenance process be performed, the data maintenance process may be performed immediately 258. Otherwise, the storage array 204 may transmit 260, to the TEA module 206, a request that the TEA module 206 identify the best timeslot to perform the data maintenance process. The request sent 260 by the storage controller may, in an embodiment, include the applicable user constraints and information. Alternatively, if the TEA module 206 already has that information, the request sent 254 by the storage array 204 may simply identify the user 202, and the TEA module 206 may cross-reference that user 202 to the application user constraints and information, including energy related considerations.

In the example presently under consideration, the TEA module 206 may identify, such as through an inferencing process for example, the optimal timeslot to perform the data maintenance requested 252 by the user 202. The TEA module 206 may then communicate 262 this finding back to the storage array 204. At this point, the storage array 204 may wait 264 until the arrival of the start of the timeslot identified 262 by the TEA module 206. Upon arrival of the start of the timeslot, the storage array 204 may then start 266, such as by sending a backup request to the backup system 208, the data maintenance process, which may comprise a data backup process in this example embodiment. Upon completion of the data maintenance process, the backup system 208 may confirm 268 to the storage array 204 that the data maintenance process has been completed.

The storage array 204 may then transmit 270 a request to the health check module 210, that a data storage health check be performed with respect to (1) the data maintenance process that was performed, and/or with respect to (2) the data involved in the data maintenance process. If the health check results indicate the health check was successful, that is, for example, the backed up data does not have any problems, the backup system 208 may confirm 272 to the storage array 204 that the health check was successful. At this point, the storage array 204 may continue 274 with its normal operations.

On the other hand, if the health check experiences a problem, the health check results sent 272 by the health check module 210 to the storage array 204 may indicate that. In this case, the results 272 may identify, for example, the affected data, and the nature of the problem such as, for example, that certain data is corrupted, or was unable to be backed up for some reason. In the case of adverse health check results, the storage array 204 may mark 276 the problematic data for repair and, at some point after the marking 276, may then repair 278 the marked data. It is noted that, in one embodiment, the health check module 210 may be co-located with the storage array 204, and/or with the backup system 208.

Continuing with the process 250, the storage array 204 may then transmit another request 280 to the health check module 210 to recheck the repaired data. The health check module 210 may perform the health check and then return 282 the results of the health check to the storage array 204. If the health check results indicate that the health check was successful, then the storage array 204 may resume 284 normal operations.

It is noted that no particular size, type, or format, of data is required be employed in any embodiment. In one example embodiment, the method 250 may be performed on a chunk-by-chunk basis, although that is not required. In another embodiment, performance of the method 250 on a broader basis may reduce the total number of transactions involved in the data maintenance process. An embodiment may also strike a balance between the energy needed to implement communications among the participants in the method 250, and the energy expected to be saved by performing the data maintenance process during a particular timeslot.

D.3 Comparative Example—Data Deletion

With reference now to FIG. 3, an architecture 300 is shown that includes various entities, namely, a host such as user 302, a storage system 304 that may comprise a storage controller and storage array, and a garbage collector module 306, each of which may communicate with the others.

A method 350 implemented in the architecture 300 may begin with the transmission 352, by the user 302 to the storage system 304, of a request to delete data residing at the storage system 304. The request may identify the data to be deleted, and may include a user-specific identifier.

In response to the request, the storage system 304 may request 354 that the garbage collector module 306 mark the applicable blocks for deletion. The garbage collector module 306 may then identify 356 the marked blocks to the storage system 304, and the storage system 304 may then provide 358 a list of the marked blocks to the garbage collector module 306.

The garbage collector module 306 may then move 360, within the storage system 304, valid data, that is, data that has been identified for deletion, to free blocks, or space, for other data. The storage system 304 may then confirm 362 to the garbage collector module 306 that the data to be deleted has been moved. In response, the garbage collector module 306 may then erase 364 the marked blocks and mark as free the space from which the blocks were erased. Finally, the storage system 304 may then report 366 to the user 302 that the data deletion is complete.

D.4 Example Embodiment—Garbage Collection

As illustrated by the comparative example of FIG. 3, no provision is made for the collection, or use, of energy-related information, such as, for example, energy consumption in the performance of the data maintenance process. Rather, the comparative method 350 is performed in a simple loop form, uninformed or influenced by energy-related considerations. In contrast, and as discussed below in connection with FIG. 4, an example embodiment may consider, for example, expected energy consumption by a garbage collection process, when making determinations as to when that garbage collection process should be performed.

Turning now to the example of FIG. 4, an architecture 400 is shown in which an example method 550 according to an embodiment may be performed. The architecture 400 may include various entities, namely, a storage array 402 that may comprise a storage controller, a garbage collection module 404, a TEA module 406, and a policy engine 408, each of which may communicate with the others.

Any of the aforementioned components may receive/transmit data and/or information and metadata from/to any of the other aforementioned components. In an embodiment, the storage array 402, the garbage collection module (GCM) 404, the TEA module 406, and the policy engine 408, may be co-located at a common site, although that is not required.

Prior to performance of the example method 450, or as part of the example method 450, various user constraints and other information, such as SLA terms, may be, or have been, provided to the TEA module 406 to inform predictions to be generated by the TEA module 406. Additionally, or alternatively, the user constraints and other information may be provided by the storage array 402, which may have received those user constraints and information from a user, when the storage array 402 sends a request for data deletion to the GCM 404. For example, the storage array 402 may generate a data deletion request that includes the user constraints and information, and that also identifies the data to be deleted.

With continued reference to FIG. 4, the example method 450 may begin when the storage array 402 transmits, to the GCM 404, a request 452 to delete data. The request may identify, for example, the owner of the data, the location of the data, and the particular data itself. The GCM 404 may then request 454, from the TEA module 406, a future timeslot or timeslots for deletion of the data.

The TEA module 406 may then determine, based on one or more user constraints and other information, including energy related considerations, when the data deletion should be performed. For example, the TEA module 406 module may determine that less expensive, and/or 'green,' energy such as solar or wind, will be available to perform the deletion at a particular timeslot on a particular day. This timeslot, or timeslots, may then be returned 456 by the TEA module 406 to the GCM 404.

In an embodiment, the cost of energy, alone, may not be the overriding consideration when selecting a timeslot to perform a data process such as data deletion. For example, and as shown in FIG. 4, policies generated and/or stored by the policy engine 408 may play a role in the timeslot selection as well. In particular, after receipt of information identifying a timeslot proposed by the TEA module 406 for performance of the garbage collection process, the GCM 404 may then query 458 the policy engine 408 to determine if the identified timeslot comports with any deletion policy, or policies, applicable to one or more aspects of the requested data deletion.

In response to the query 458, the policy engine 408 may either indicate that the requested timeslot does not present a conflict with the applicable policy or policies. That is, the policy engine 408 may communicate 460 to the GCM 404 that the requested timeslot is suitable, and that the GCM 404 should wait until the beginning of the timeslot to initiate the data deletion process.

Upon receipt of the communication 460 from the policy engine 408, the GCM 404 may then notify 462 the storage array 402 to enter a waiting period that ends with the beginning of the timeslot. The storage array 402 may use a timer or other process or mechanism to determine that the start of the timeslot has arrived, and may notify 464 the GCM 404 accordingly. The GCM 404 may then perform 466 the requested data deletion process, and the storage array 402 may notify 468 the CGM 404 when data deletion has been completed. The method 450 may then terminate.

However, in the case where the query 458 results in a finding by the policy engine 408 that the requested timeslot is unsuitable, the policy engine 408 may notify 470 the GCM 404 accordingly. The notification 470 may include an instruction that the GCM 404 should, instead of deleting the data during the identified timeslot, proceed with the data deletion, which may or may not overlap with the identified timeslot, or may occur before or after the timeslot, according to an applicable deletion policy. Accordingly, GCM 404 may then request 472 that the data be deleted according to the policy. Finally, the storage array 402 may notify 474 the GCM 404 when the data deletion has been completed.

E. Example Methods

It is noted with respect to the disclosed methods, including the example methods disclosed in the Figures, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

A data maintenance method according to one embodiment may be performed at least in part by a system that includes a TEA module, a data backup system, and a health check module. The system may take the form of a data protection system, such as may be hosted at a cloud site, or user premises. This data protection system communicate with a storage array, which may be a user storage array located at a user premises. A data deletion method according to one embodiment may be performed in whole, or in part within, a storage array that includes a GCM, a TEA module, and a policy engine.

F. Further Example Embodiments

Following are some further example embodiments of the invention. These are presented only by way of example and are not intended to limit the scope of the invention in any way.

Embodiment 1. A method, comprising: receiving a request to perform a data process; determining, by a trustworthy energy awareness (TEA) module, based on energy information and user constraints, a best time to perform the data process; and conveying, by the TEA module to a recipient, information indicating the best time to perform the data process.

Embodiment 2. The method as recited in any preceding embodiment, wherein the determining is performed by a trained machine learning (ML) model of the TEA module.

Embodiment 3. The method as recited in any preceding embodiment, wherein the data process comprises a data maintenance process.

Embodiment 4. The method as recited in embodiment 3, wherein the data maintenance process comprises a data backup process, and a storage health check is performed after completion of the data backup process to identify any problems with data that was backed up as part of the data backup process.

Embodiment 5. The method as recited in embodiment 3, wherein the request is received by a storage array from a user.

Embodiment 6. The method as recited in any preceding embodiment, wherein the data process comprises a data deletion process.

Embodiment 7. The method as recited in embodiment 6, wherein when the best time to perform the data process conflicts with a data deletion policy, the data is deleted according to the data deletion policy regardless of whether the data deletion occurs during the best time or not.

Embodiment 8. The method as recited in embodiment 6, wherein the request is received by a garbage collection module from a storage array.

Embodiment 9. The method as recited in any preceding embodiment, wherein the energy information comprises information indicating a first timeslot when energy is relatively less expensive than it is during a second timeslot.

Embodiment 10. The method as recited in any preceding embodiment, wherein the energy information comprises an expected cost of energy to perform the data process, and/or information about availability of a green energy source to perform the data process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
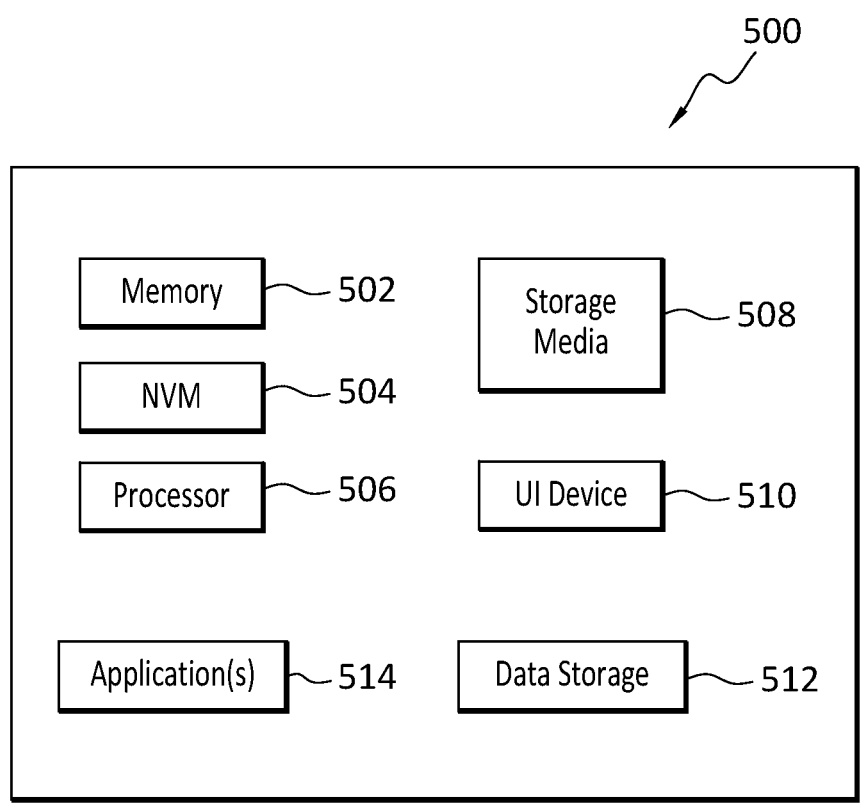
FIG. 5 discloses a computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, by a storage array from a user, a request to perform a data backup process;
determining, by a trustworthy energy awareness (TEA) module in communication with the storage array, based on energy information that includes an amount of energy expected to be consumed by the data backup process, and also based on user constraints that comprise one or more service level agreement (SLA) terms, a best time to perform the data backup process;
conveying, by the TEA module to the storage array, information indicating the best time for the storage array to perform the data backup process;
by the storage array, waiting until the best time, and then beginning the backup process at the best time; and
by the storage array, transmitting to a health check module, a request that the health check module perform a data storage health check with respect to the data backup process, and with respect to data backed up as part of the data backup process.

2. The method as recited in claim 1, wherein the determining is performed by a trained machine learning (ML) model of the TEA module.

3. The method as recited in claim 1, wherein the data storage health check used to identify any problems with the data that was backed up as part of the data backup process.

4. The method as recited in claim 1, wherein after the data storage health check is performed, the storage array marks any problematic data, identified by the health check module, for repair.

5. The method as recited in claim 4, wherein the storage array repairs the problematic data.

6. The method as recited in claim 5, wherein the the problematic data is rechecked after it is repaired.

7. The method as recited in claim 1, wherein determining the best time is based on a balancing of an amount of energy needed to implement communications among the user, the storage array, the TEA module, and the health check module, is balanced with an amount of energy expected to be saved by performing the data backup process at the best time.

8. The method as recited in claim 1, wherein the energy information comprises information indicating a first timeslot when the energy expected to be consumed by the data backup process is relatively less expensive than it is during a second timeslot.

9. The method as recited in claim 1, wherein the energy information comprises an expected cost of energy to perform the data backup operation, and/or information about availability of a green energy source to perform the data backup process.

10. A non-transitory storage medium having stored therein instructions that are executable by one or more hardware processors to perform operations comprising:
receiving, by a storage array from a user, a request to perform a data backup process;
determining, by a trustworthy energy awareness (TEA) module in communication with the storage array, based on energy information that includes an amount of energy expected to be consumed by the data backup process, and also based on user constraints that comprise one or more service level agreement (SLA) terms, a best time to perform the data backup process;
conveying, by the TEA module to the storage array, information indicating the best time for the storage array to perform the data backup process;
by the storage array, waiting until the best time, and then beginning the backup process at the best time; and
by the storage array, transmitting to a health check module, a request that the health check module perform a data storage health check with respect to the data backup process, and with respect to data backed up as part of the data backup process.

11. The non-transitory storage medium as recited in claim 10, wherein the determining is performed by a trained machine learning (ML) model of the TEA module.

12. The non-transitory storage medium as recited in claim 10, wherein the data storage health check used to identify any problems with the data that was backed up as part of the data backup process.

13. The non-transitory storage medium as recited in claim 10, wherein after the data storage health check is performed, the storage array marks any problematic data, identified by the health check module, for repair.

14. The non-transitory storage medium as recited in claim 13, wherein the storage array repairs the problematic data.

15. The non-transitory storage medium as recited in claim 14, wherein the the problematic data is rechecked after it is repaired.

16. The non-transitory storage medium as recited in claim 10, wherein determining the best time is based on a balancing of an amount of energy needed to implement communications among the user, the storage array, the TEA module, and the health check module, is balanced with an amount of energy expected to be saved by performing the data backup process at the best time.

17. The non-transitory storage medium as recited in claim 10, wherein the energy information comprises information indicating a first timeslot when the energy expected to be consumed by the data backup process is relatively less expensive than it is during a second timeslot.

18. The non-transitory storage medium as recited in claim 10, wherein the energy information comprises an expected cost of energy to perform the data backup operation, and/or information about availability of a green energy source to perform the data backup process.

* * * * *